US007772720B2

(12) United States Patent
McGee et al.

(10) Patent No.: US 7,772,720 B2
(45) Date of Patent: Aug. 10, 2010

(54) SUPERCAPACITOR AND CHARGER FOR SECONDARY POWER

(75) Inventors: Phillip McGee, Owatonna, MN (US); Corey Ermer, Hollandale, MN (US)

(73) Assignee: SPX Corporation, Charlotte, NC (US)

( * ) Notice: Subject to any disclaimer, the term of this patent is extended or adjusted under 35 U.S.C. 154(b) by 259 days.

(21) Appl. No.: 11/949,427

(22) Filed: Dec. 3, 2007

(65) Prior Publication Data

US 2009/0140575 A1   Jun. 4, 2009

(51) Int. Cl.
*H02J 7/00* (2006.01)
(52) U.S. Cl. .................................................. 307/66
(58) Field of Classification Search ............... 307/10.1, 307/66; 320/104
See application file for complete search history.

(56) References Cited

U.S. PATENT DOCUMENTS

| 5,969,505 | A  | * | 10/1999 | Okamura ............... 320/122 |
| 7,015,674 | B2 | * | 3/2006 | VonderHaar ............ 320/103 |
| 2004/0054503 | A1 | * | 3/2004 | Namaky ................. 702/183 |
| 2004/0125618 | A1 | * | 7/2004 | De Rooij et al. .......... 363/17 |

* cited by examiner

*Primary Examiner*—Albert W Paladini
*Assistant Examiner*—Carlos Amaya
(74) *Attorney, Agent, or Firm*—Baker & Hostetler LLP

(57) ABSTRACT

A secondary power source system, includes a first unit receiving a primary power input and restricting a current used for charging to a predetermined amount, a second unit including a device providing capacitance, receiving a first output from the first unit with restricted current, a third unit generating a second output of a certain voltage, and a fourth unit performing a logical OR operation with the primary power input, first output from the first unit and second output from the second unit, to generate a single third output of a certain voltage.

25 Claims, 7 Drawing Sheets

SUPERCAPACITOR AND CHARGER FOR SECONDARY POWER

FIELD OF THE INVENTION

The present invention relates generally to a power source. More particularly, the present invention relates to a secondary power source and charging for the secondary power source.

BACKGROUND OF THE INVENTION

Currently, when there is an interruption in the power supply to a vehicle or a device connected to the vehicle, many of the on-board devices of the vehicle or the circuitry in the device connected to the vehicle can be affected. This is especially important with regard to logic circuits or other memory type devices on a communication device that require an uninterrupted power supply in order to maintain either the data in the memory, the settings in the system, or power to accommodate communication between a computing device connected to the vehicle.

For example, when the primary power supply is reduced or shutoff, the settings and data in a memory can be lost, especially if it is a random access memory, which needs a constant power supply to maintain the settings and data. Therefore, when such an incident occurs, the memory unit loses all the information and the data has to be re-entered and the settings for the vehicle, or other information in the communication device, have to be reset.

Circuitry within a communication device accommodating connection between a diagnostic tool or a personal computer connected to a vehicle or the circuitry within the vehicle that draws power from the main power is then reliant on the main power. A backup power system can be added to a device, however, this then increases the cost and then there is a problem with the size and replacement of the backup power and the time it takes to charge the backup power. Further, if the device or circuits that needs the backup power is small, then it is difficult to provide such a backup power within the housing of the device or circuits.

Further, there is the issue of maintaining the proper power supply to the circuits and logic circuits as the power supply must be maintained at a certain level so that the logic circuits are not damaged. It is critical that the supply does not vary much from the parameters of the circuits, because the logic circuits are very sensitive to the power that is provided.

Interruption of the power supply can be catastrophic as there can be loss of data and even the malfunctioning of an electrical device, because the power has been interrupted, even if it is for a short period of time. As mentioned above, the loss of power can reset the device, which may cause problems if certain customized settings were used. Specifically, there can be major data loss, including data collected over a long period of time or a short period of time in random access memory, which can cause major delays and problems in rectifying the situation, Accordingly, it is desirable to provide an electrical energy storage unit and charger as a secondary power to a device to minimize the power interruption.

SUMMARY OF THE INVENTION

The foregoing needs are met, to a great extent, by the present invention, wherein one aspect of an apparatus is provided that in some embodiments to provide an electrical energy storage unit and charger as a secondary power to a device.

In accordance with one embodiment of the present invention, a secondary power source system, including a first unit receiving a primary power input and restricting a current used for charging to a predetermined amount, a second unit comprising a device storing electrical energy, receiving a first output from the first unit with restricted current, a third unit generating a second output of a certain voltage, a fourth unit performing a logical OR operation with the primary power input, first output from the first unit and second output from the second unit, to generate a single third output of a certain voltage.

The device storing electrical energy can also be a capacitor. The device storing electrical energy can also be a super capacitor or ultra capacitor with a certain energy density. The first unit can includes a charging device receiving the primary power input and regulating the first power output. The charging device includes controlling the current. The device for storing electrical energy includes a plurality of capacitors in series.

The device storing electrical energy can include a plurality of super capacitors in series. The primary power source, first power output, second power output and third power output can be in a range between and including 3.3 volts to 5 volts. The first unit can include a charging device accommodating the restriction of current to the certain amount and includes thermal regulation. A logic circuit of a device can maintain a certain power in the third power output when the primary power source is reduced from a certain power.

In accordance with still another embodiment of the invention, a secondary power source system, includes a means for charging receiving a certain power input, a means for providing capacitance being charged by the means for charging, a means for a voltage regulator generating a certain voltage from the power input from the means for providing capacitance, and a means for selecting between the certain power input, output from the means for providing capacitance, and the output from the means for the voltage regulator.

An output from the means for selecting can be forwarded to a logic circuit of a device accommodating a providing of the secondary power source when the primary power source has been reduced. A logic circuit can receive a predetermined power from the means for selecting when a primary power source is reduced from a certain power. The means for providing capacitance can include a super capacitor. The means for providing capacitance can include a plurality of super capacitors in series.

The means for charging can include a charging device with thermal regulation. The means for charging restricts the current used for charging to a predetermined current. A voltage from the means for the voltage regulator can provide a voltage less than the certain power input of the means for charging. The secondary power source can provide the output power from the means for selecting operating online with a vehicle power source to all uninterrupted power source during a cold cranking incident.

The output from the means for selecting accommodating only a power to certain communication and memory operation of a unit can be powered by the secondary power source system.

In accordance with yet another embodiment of the invention, a method of providing a secondary power source, includes receiving a primary power input and restricting a current used for charging to a predetermined amount, receiving a first output from the first unit with restricted current and storing the power in a capacitance unit, generating a second output of a certain voltage, and performing a logical OR operation with the primary power input, first output from the first unit and second output from the second unit, to generate a single third output of a certain voltage.

The method can further include providing a device uninterrupted power supply from the single third output when there is a cold cranking incident with the vehicle. The capacitance unit can be a super capacitor or ultra capacitor with a certain energy density. The charging device can receive the primary power input and regulate the first power output. The charging device can include thermal regulation and current regulation.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
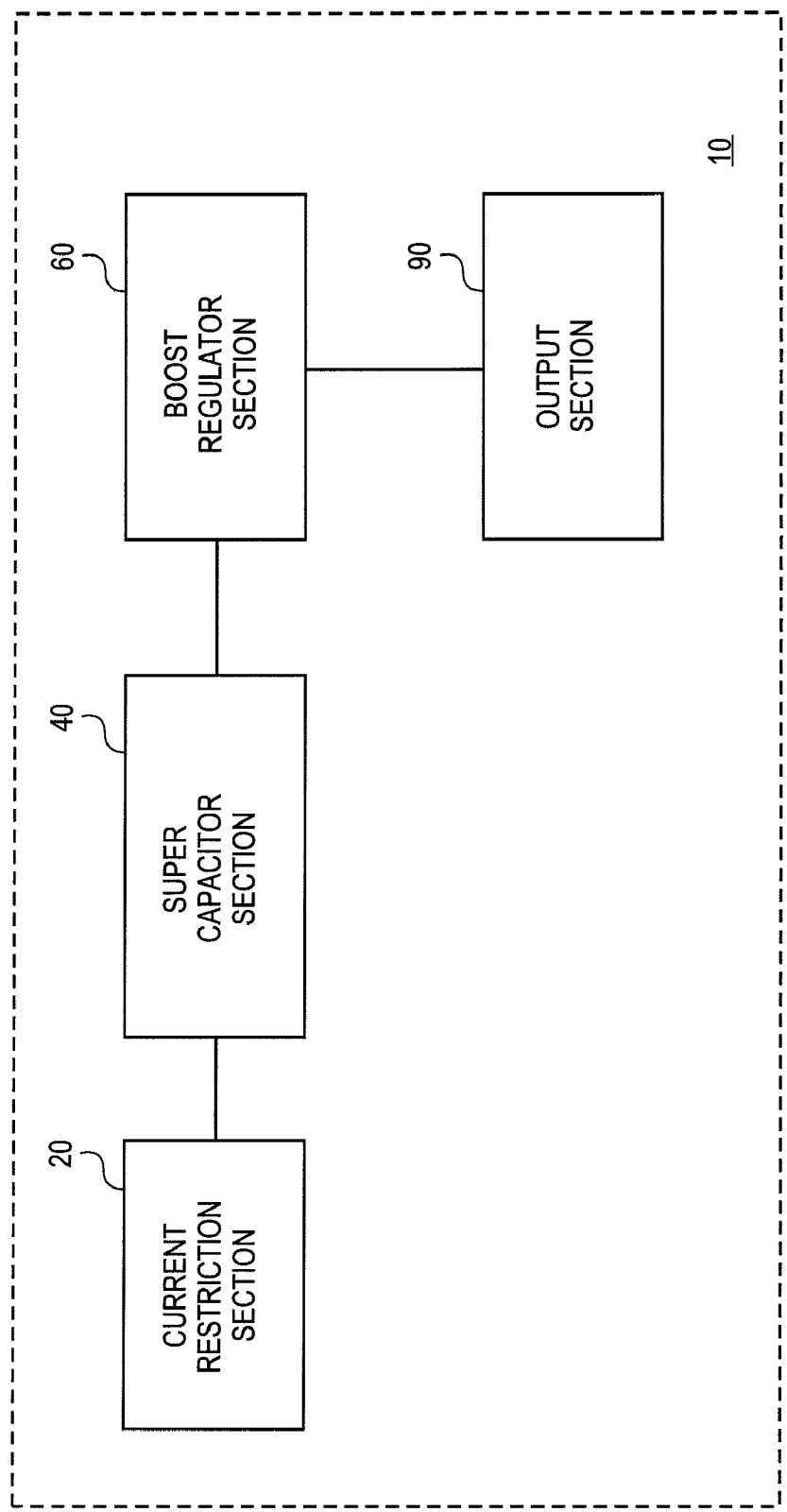
FIG. 1 is a block diagram according to an embodiment of the invention.

The invention will now be described with reference to the drawing figures, in which like reference numerals refer to like parts throughout. An embodiment in accordance with the invention includes a secondary power supply that provides an uninterrupted power supply. The invention provides an electrical energy storage unit and charger that supply electrical energy as secondary power. The invention includes the use of capacitors including super capacitors that have to be charged.

Referring to FIG. 1, an example of a block diagram of the circuit of a secondary power unit 10 of the invention is shown. A current restriction section 20 feeds into a super capacitor section 40, which then connects with a boost regulator section 60, and finally the signal is outputted in the output section 90 of the secondary power unit 10. In other embodiments, additional sections can be added or some of the sections mentioned above can be combined or removed.

The current restriction section 20 takes a $5V_{DC}$ (volt direct current) rail 36 (shown in FIG. 2) and uses it to charge the supercapacitors of the supercapacitor section 40. Other voltages can also be used, since 5 volts is only an example and is not meant to be limiting. One of the principle purposes of the current restriction section 20 is to restrict the amount of current used for charging to a current such as 200 mA (milliamps) or a previously determined level. Other current levels can be used, but the current should be maintained at least at the predetermined level or within a certain variance from the predetermined level. The purpose of restricting the current is to maintain some level of safety during charging, otherwise the system will attempt to draw an excessive amount of current to immediately charge the super capacitors of the super capacitor section 40. This massive inrush of power would potentially create sparking and could ignite flammable gases. Therefore, having the current restriction section helps in the safety and reliability of the secondary power unit 10.

Figure 2:
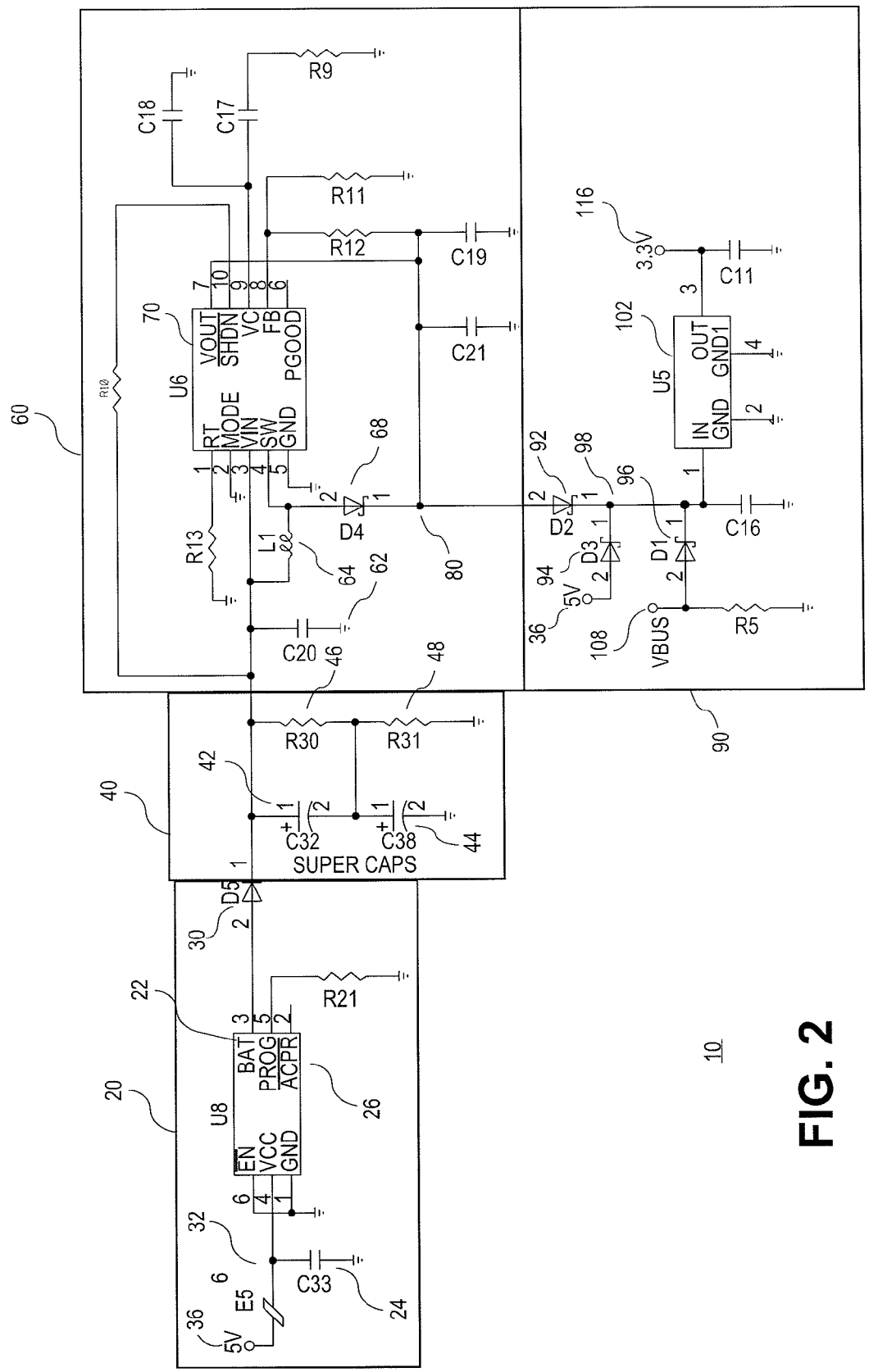
FIG. 2 is a schematic detail of the block diagram of FIG. 1.

Referring to FIG. 2, the 5 volt rail 36 is fed into a linear charger 26. The charger 26 can charge batteries such as lithium ion, nickel-metal hydride, and nickel cadmium or other power chargeable devices such as super capacitors 42, 44. The charger 26 can have thermal regulation capabilities to maintain stability in the system. The charger 26 can be a constant current and constant voltage linear charger and can work for example with USB (Universal Serial Bus) power specifications. An external resistor, MOSFET (metal-oxide semiconductor field effect transistor) or blocking diode is not required when using the charger 26 in the secondary power unit 10. When the 5VDC rail 36 is removed, the charger can automatically enter into a low current state, dipping the battery current drain to less than the set current. When, however, the power is applied through the $5V_{DC}$ rail 36, the charger 26 can be placed into a mode where the supply current is at the set current. The power input for the charger 26 can include capacitance through a capacitor 24 at a node 32 between the charger 26 and the $5V_{DC}$ rail 36. The output to charge the battery (BAT) 22 is sent through a diode 30, which restricts the direction of the flow of current away from the charger 26 and into the supercapacitor unit 40.

The super capacitor section 40 contains the super capacitors 42, 44. The super capacitors 42 and 44 are placed serially to increase their voltage handling capability. Other configurations and quantity of super capacitors can also be used.

A super capacitor stores energy by physically separating positive and negative charges, whereas a battery will perform such an activity on a chemical basis. The interior materials have a high surface area, aiding in the high density of energy that can be stored.

The ultra capacitor can include a double-layer structure that polarizes an electrolytic solution to store energy electrostatically. Since there are no chemical reactions, the ultra capacitor is quick at charging and discharging like the supercapacitors 42 and 44.

The supercapacitor 42,44 can be two non-reactive porous plates or collectors, suspended within an electrolyte with a voltage potential applied across the collectors. Once the super capacitor is charged, any device may use its energy. The energy density is much higher than ordinary capacitors.

The physical actions in the supercapacitor aid in the fast release of energy and the fast charging of the capacitor. The supercapacitors 42 and 44 can be placed in an RC circuit with resistors 46 and 48, with the output going into the boost regulator section 60.

The boost regulator section 60 is a boost regulator to generate, for example, $4.6V_{DC}$. Other voltages can be generated, depending on the application of the secondary power unit 10. In this example, the $4.6 V_{DC}$ voltage was chosen so that the $5 V_{DC}$ rail would be provided preferentially in the diode logic OR'ing node in the output section 90.

The output from the super capacitor section 40 is sent through a LC circuit of the capacitor 44 and an inductor 64, and the input is entered into a synchronous boost converter 70. Schottkey diode 68 is also sent a signal from the inductor 64 and fed into the output node 80, which also receives the output from the boost converter 70. The boost converter 70 is a step-up DC/DC converter that operates from a certain input voltage. The boost converter 70 can include a MOSFET switch and synchronous rectifier, for example. The external Schottkey diode 68 is not required but included in the example. The output from the output node 80 is fed into the output section 90.

The output section 90, OR's together the three different potential voltage sources so a single $3.3V_{DC}$ rail 116 can be generated. The rail 116 can be other voltages and the $3.3V_{DC}$ is only shown as an example.

The output from the output node 80 is sent through the Schottkey diode 92 and outputted into node 98. The $5V_{DC}$ rail 36 and the bus voltage VBUS 108, also meet at node 98 through Schottkey diode 96. The $5V_{DC}$ 36, VBUS 108, and the $4.6 V_{DC}$ from the boost regulator section 60 are OR'd together to form a single $3.3 V_{DC}$ output at node 98. The output from the node 98 is sent to a low dropout regulator 102 which is capable of supplying a certain current with a certain low dropout voltage, thus providing a stable output.

Figure 3:
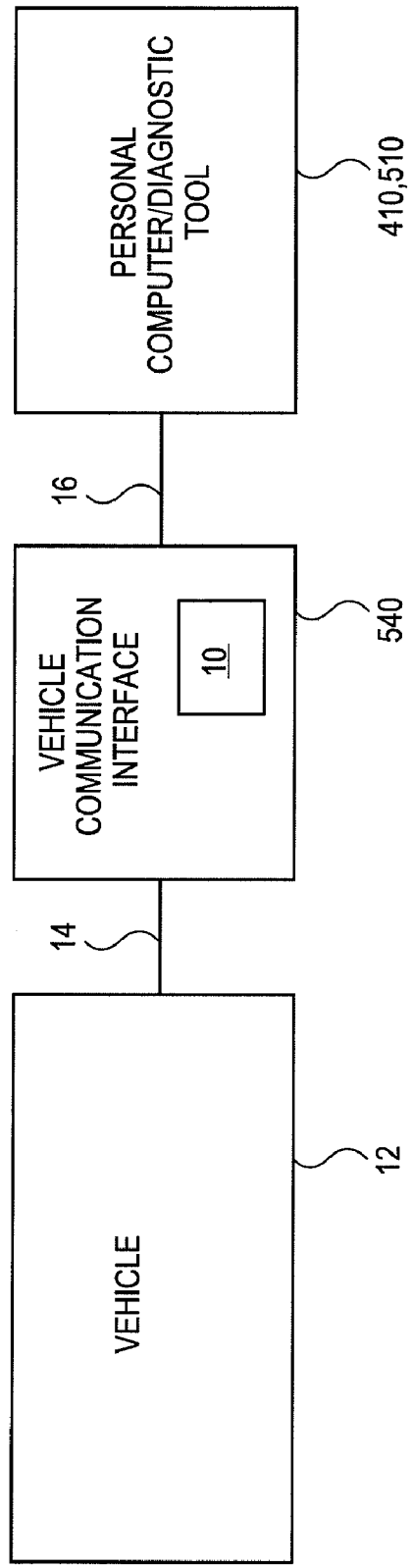
FIG. 3 is a diagram of the connection to vehicle.

Referring to FIGS. 2 and 3, the invention can limit the charge voltage and current to a specified level. The invention eliminates over-charging (which may cause damage) of the supercapacitors 42, 44, and open arching when connecting to a vehicle 12. The invention is also used as a backup power source for any type of device, including, for example, a vehicle communication interface 540 that communicates between the vehicle 12 and a computing device, such as a diagnostic tool 510, a personal computer 410, or handheld computer, when the vehicle communication interface 540 is disconnected from the main power source of the vehicle. Also, data downloaded to the diagnostic tool 510 or personal computer 410 can be communicated despite a power loss.

Figure 4:
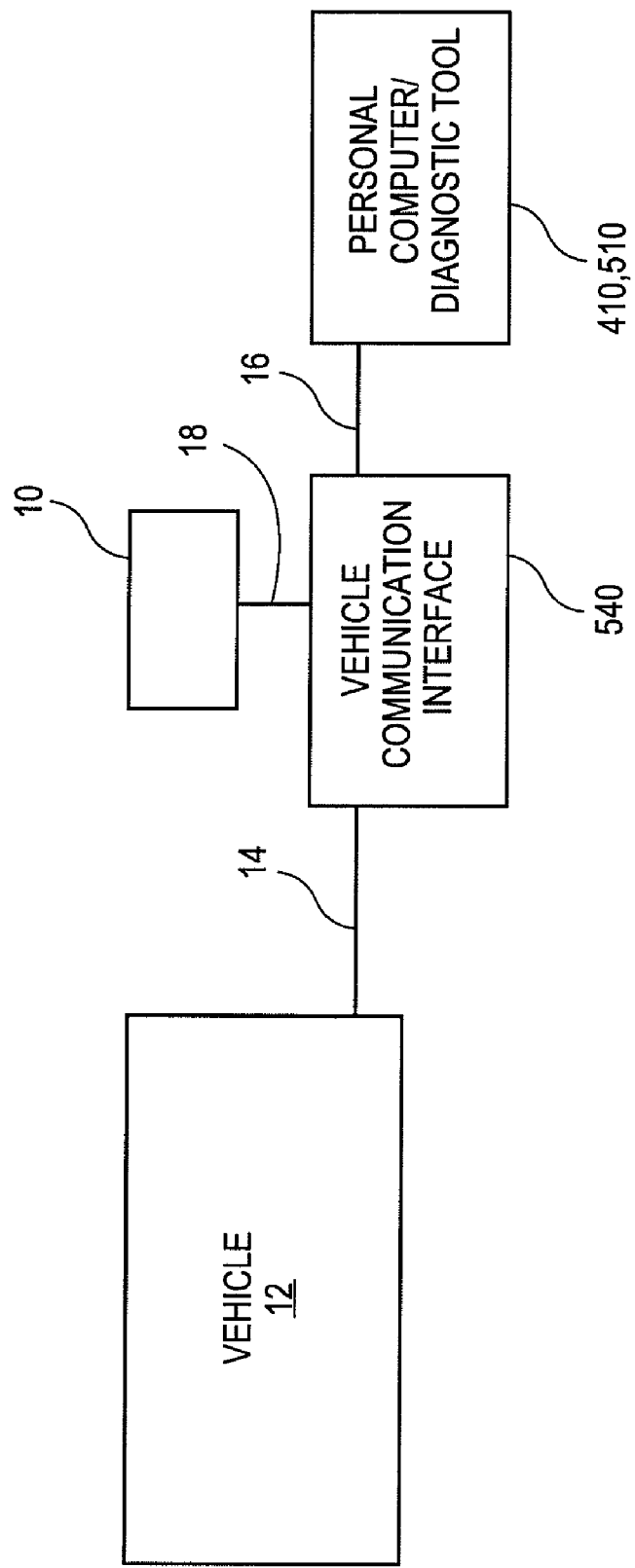
FIG. 4 is a diagram of an alternative connection to a vehicle.

Referring to FIGS. 3 and 4, for example, the vehicle 12 can provide the primary power to the vehicle communication interface 540. The secondary power unit 10 can be, either integrated into the vehicle communication interface 540 as seen in FIG. 3, or outside of the vehicle communication interface, and connected electrically through a link 18, as seen in FIG. 4. The secondary power circuit 10, can be linked, either wirelessly, or through the wire by link 16.

Further, the invention provides for regulated power to the device's core logic during reduced or removed voltage from a vehicle 12. This has a distinct advantage over using a battery due to the significantly reduced amount of charging time and current as shown above.

The secondary power unit 10 provides for a unit, such as a diagnostic tool 510 or personal computer 410, to communicate for at least a short period of time, independent of any other power source, with the vehicle 12. This option is capable of operating the unit for a minimum of 5 seconds. In other embodiments, additional operating time is possible and part of the invention. The independent power source is able to operate on-line with the vehicle 12 power source to allow the unit, such as a vehicle communication interface 540, an uninterrupted power source, for example, during a cold cranking incident.

Applicable communications with the host, such as a vehicle 12 connected to the unit, are to be maintained during a cold cranking incident. The blocks of circuitry that draw power from the 3.3V rail 116 can receive power during a cold cranking incident. This will allow the operation of, for example, RS232, USB (Universal Serial Bus) or the BLUETOOTH module in addition to a microcontroller such as an S12X, RAM (Random Access Memory), and Serial Flash, such as non-volatile memory, as seen in FIGS. 3 and 4 with the secondary power unit 10 and the vehicle communication interface. The software will need to shutdown unused host communication interfaces when not needed, as this will maximize the duration of operation for the tool during a cold cranking incident, as the super-caps (supercapacitors) 42 and 46 will be used to support this functionality.

Figure 5:
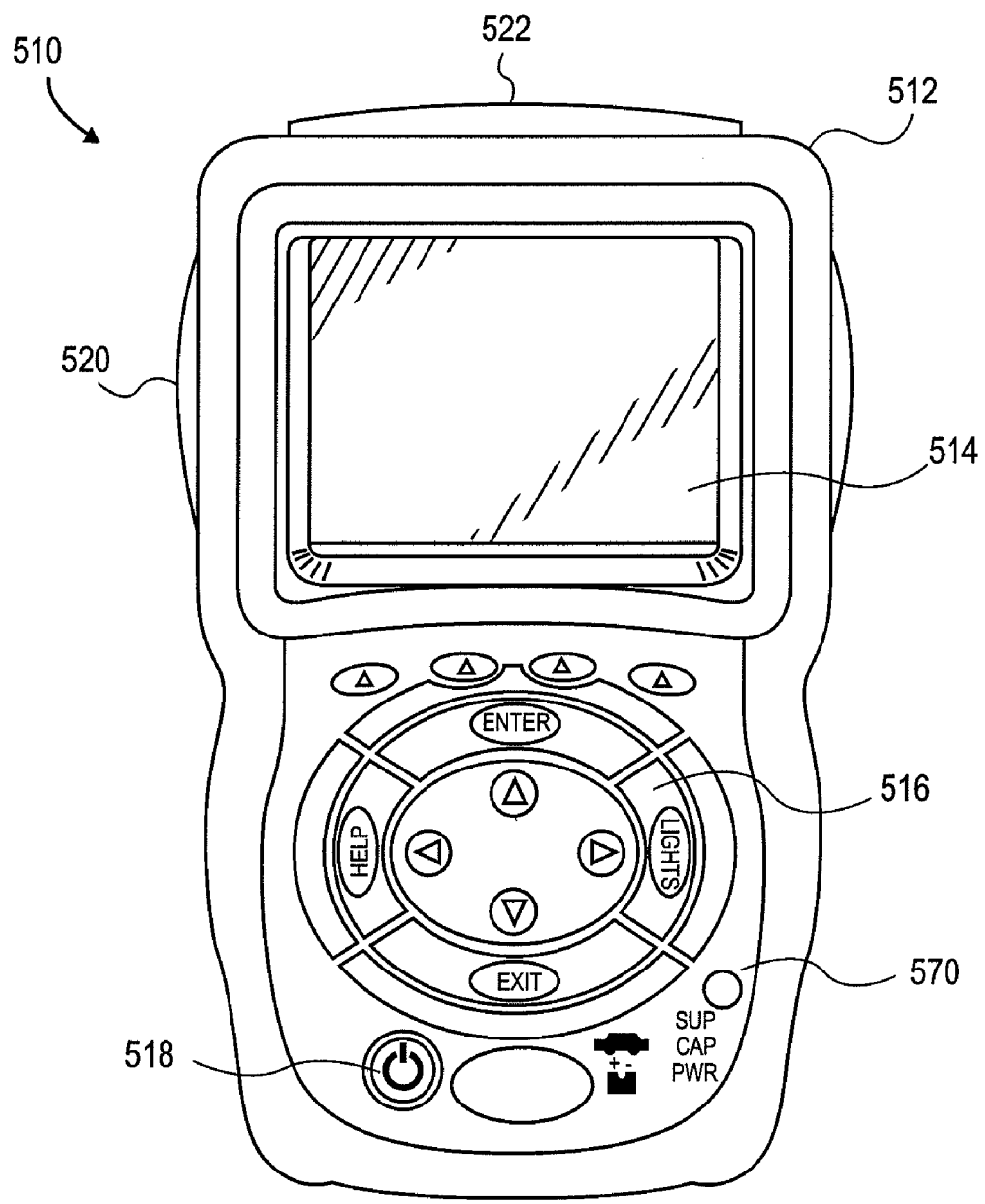
FIG. 5 is a front view of a diagnostic tool.
Figure 6:
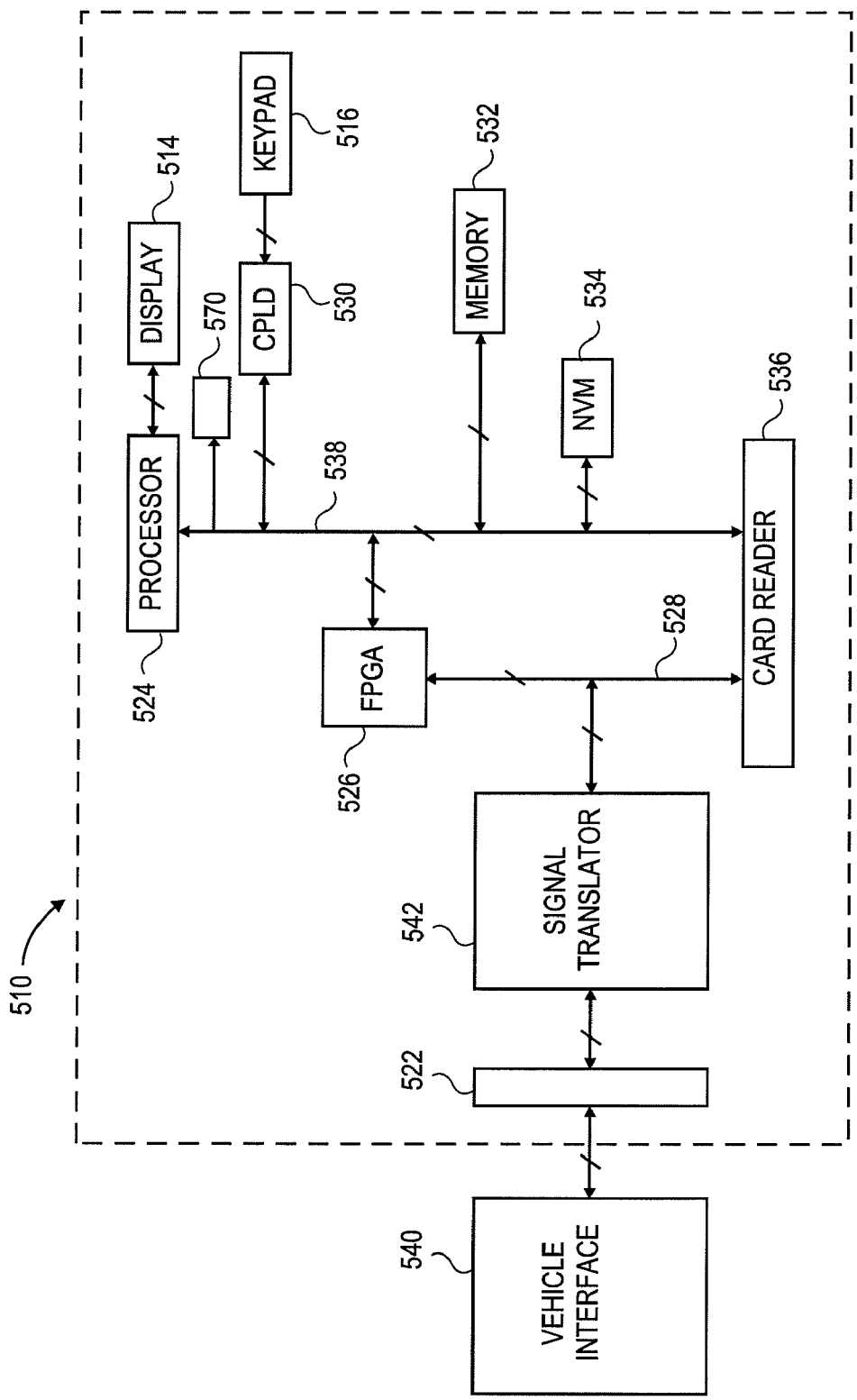
FIG. 6 is a schematic diagram of the diagnostic tool of FIG. 5.

Referring to FIGS. 5 and 6, additionally, there can be an indicator signal labeled SUPCAP PWR 570 (connected to the processor 524) which indicates that the communication to the diagnostic tool 510 is being powered from the super-caps (supercapacitors) 42, 44. The microcontroller 524 will then have to ensure that it is prepared for a complete loss. The indicator for supercapacitor power can also be located on the vehicle communication interface 540 itself, or on the personal computer 410 display 820.

Referring to FIGS. 3 and 4, the secondary power unit 10 can be located in a plurality of different configurations as mentioned above. For example, as seen in FIG. 3, the secondary power unit 10 can be included in the vehicle communication interface 540, which is connected between the vehicle 12 or device being tested and the diagnostic tool 510 or personal computer 410.

Referring to FIG. 4, the secondary power unit 10 can be external to the vehicle communication interface 540 but connected to it, and the vehicle communication interface 540 or other communication interfaces are connected to a personal computer 410, or alternatively, the diagnostic tool 510.

FIGS. 5-6 show the details of the diagnostic tool 510 of FIG. 3. Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems of using the diagnostic tool since there are limitations in troubleshooting the actual cause of the functional anomaly of the diagnostic tool. A user is forced to look directly at the diagnostic tool's limited display that may display only the DTC or simple indicator of function being performed, and a message indicating a communication failure.

In an embodiment of the invention, the diagnostic tool will run an application that accommodates the tool recording the cable used, the exact vehicle configuration that was entered, records communication transmissions and responses, hardware configuration, etc. If the user of the diagnostic tool is in case where the tool does not respond as anticipated, the user can indicate such information and communicate such information to a technical service line for interpretation. The information will then help determine if the user had incorrectly configured the tool for the vehicle (incorrect cable, wrong information entered, etc.). Automation of some or the entire process can also be performed.

FIG. 5 is a front view illustrating a diagnostic tool 510 according to an embodiment of the invention. The diagnostic tool 510 can be any computing device, for example, the NEMISYS or GENISYS diagnostic tool from Service Solutions (part of the SPX Corporation) or other diagnostic tool. The diagnostic tool 510 includes a housing 512 to encase the various components of the diagnostic tool 510, such as a display 514, a user interface 516, a power button 518, a memory card reader 520 and a connector interface 522. The display 514 can be any type display, including, for example, but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the diagnostic tool 510. The user interface 516 allows the user to interact with the diagnostic tool 510, in order to operate the diagnostic tool as the user prefers. The user interface 516 can include function keys, arrow keys or any other type of keys that can manipulate the diagnostic tool 510 in order to operate the diagnostic tool through the software. The user interface or input device 516 can also be a mouse or any other suitable input device for the user interface 516, including a keypad, touchpad, etc. The user interface 516 can also include keys correlating to numbers or alphanumeric characters. Moreover, as mentioned above, when the display 514 is touch sensitive, the display 514 can supplement or even substitute for the user interface 516. The power key or button 518 allows the user to turn the power to the diagnostic tool 510 on and off, as required.

A memory card reader 520 can be a single type card reader, such as, but not limited to, a compact flash card, floppy disk, memory stick, secure digital, flash memory or other type of memory. The memory card reader 520 can be a reader that reads more than one of the aforementioned memory such as a combination memory card reader. Additionally, the card reader 520 can also read any other computer readable medium, such as CD (compact disc), DVD (digital video or versatile disc), etc.

The connector interface 522 allows the diagnostic tool 510 to connect to an external device, such as, but not limited to, an ECU (electronic control unit) of a vehicle, a computing device, an external communication device (such as a modem), a network, etc. through a wired or wireless connection. Connector interface 522 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

FIG. 6 is a block diagram of the components of a diagnostic tool 510. In FIG. 2, the diagnostic tool 10, according to an embodiment of the invention, includes a processor 524, a field programmable gate array (FPGA) 526, a first system bus 528, the display 514, a complex programmable logic device (CPLD) 530, the user interface 516 in the form of a keypad, a memory subsystem 532, an internal non-volatile memory (NVM) 534, a card reader 536, a second system bus 538, the connector interface 522, and a selectable signal translator 542. A vehicle communication interface 540 is in communication with the diagnostic tool 510 through connector interface 522 via an external cable. The connection between the vehicle communication interface 540 and the connector interface 522 can also be a wireless connection such as BLUETOOTH, infrared device, wireless fidelity (WiFi, e.g. 802.11), etc.

The selectable signal translator 542 communicates with the vehicle communication interface 540 through the connector interface 522. The signal translator 542 conditions signals received from a motor vehicle control unit through the vehicle communication interface 540 to a conditioned signal compatible with the diagnostic tool 510. The translator 542 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J 1708, RS232, controller area network (CAN), or other communication protocols that are implemented in a vehicle.

The circuitry to translate a particular communication protocol can be selected by the FPGA 526 (e.g., by tri-stating unused transceivers) or by providing a keying device that plugs into the connector interface 522 that is provided by diagnostic tool 510 to connect diagnostic tool 510 to vehicle communication interface 540. Translator 542 is also coupled to FPGA 526 and the card reader 536 via the first system bus 528. FPGA 526 transmits to and receives signals (i.e., messages) from the motor vehicle control unit through the translator 542.

FPGA 526 is coupled to the processor 524 through various address, data and control lines by the second system bus 538. FPGA 526 is also coupled to the card reader 536 through the first system bus 528. Processor 524 is also coupled to the display 514 in order to output the desired information to the user. The processor 524 communicates with the CPLD 530 through the second system bus 538. Additionally, the processor 524 is programmed to receive input from the user through the user interface 516 via the CPLD 530. The CPLD 530 provides logic for decoding various inputs from the user of diagnostic tool 510 and also provides the glue-logic for various other interfacing tasks.

Memory subsystem 532 and internal non-volatile memory 534 are coupled to the second system bus 538, which allows for communication with the processor 524 and FPGA 526. Memory subsystem 532 can include an application dependent amount of dynamic random access memory (DRAM), a hard drive, and/or read only memory (ROM). Software to run the diagnostic tool 510 can be stored in the memory subsystem 532. The internal non-volatile memory 534 can be, but not limited to, an electrically erasable programmable read-only memory (EEPROM), flash ROM, or other similar memory. The internal non-volatile memory 534 can provide, for example, storage for boot code, self-diagnostics, various drivers and space for FPGA images, if desired. If less than all of the modules are implemented in FPGA 526, the non-volatile memory 534 can contain downloadable images so that FPGA 526 can be reconfigured for a different group of communication protocols.

Figure 7:
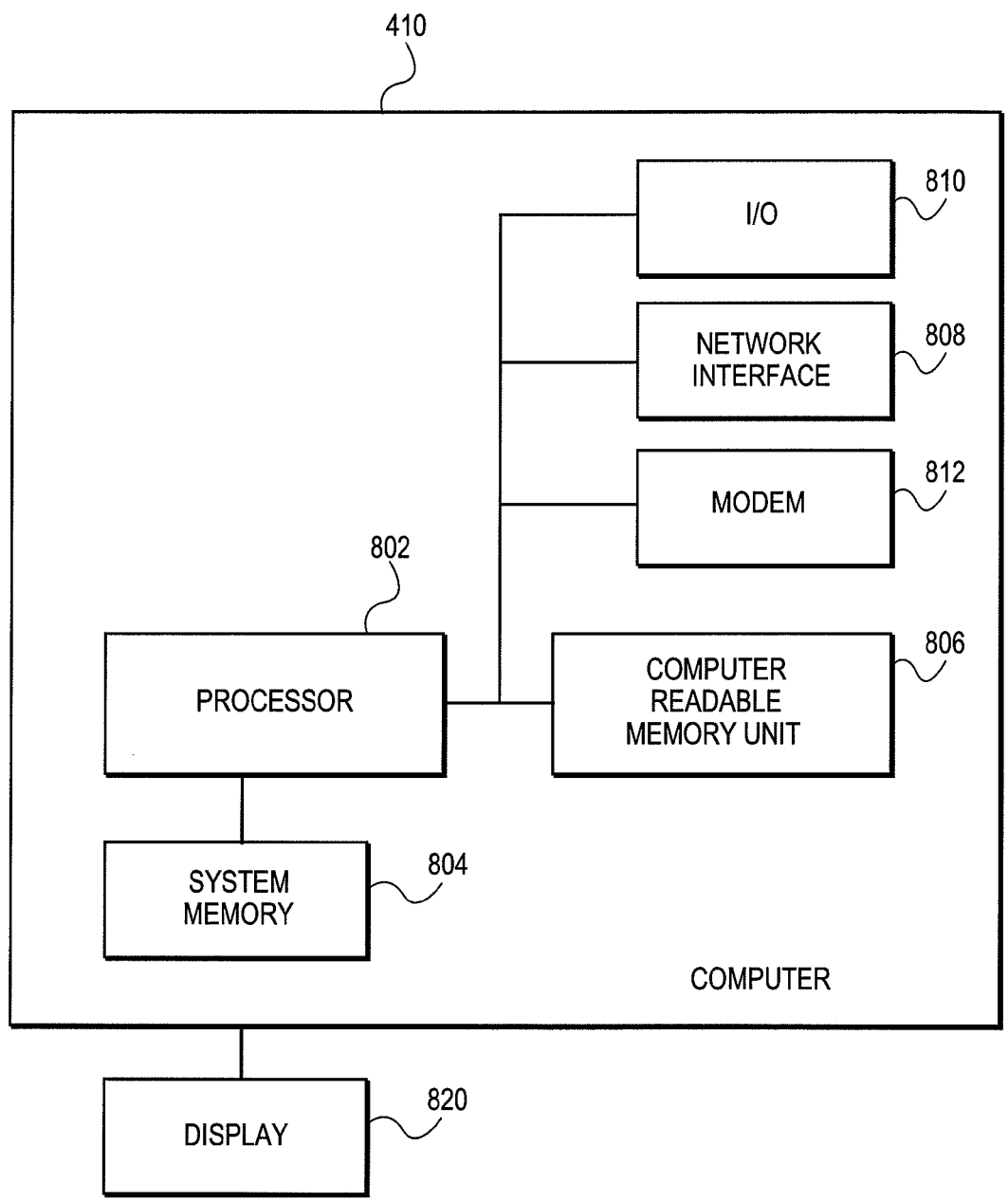
FIG. 7 is a block diagram of an exemplary computer of FIGS. 3 and 4 with a computer readable medium.

Referring to FIG. 7, an example of a computer 410, but not limited to this example of the computer 410, that can read computer readable media that includes computer-executable instructions of the invention. The computer 410 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 410 can output through, for example, the I/O 810, data for display on a display device 820.

The invention or parts thereof, can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The invention can include the computer-readable medium having stored thereon a data structure including a plurality of fields containing data representing the techniques of the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A secondary power source system for a communication device, comprising:
   a first unit configured to receive a primary power input and restrict a current used for charging to a predetermined amount, wherein the current is part of a first output of the first unit;
   a second unit comprising a device that stores electrical energy, the second unit configured to receive the first output from the first unit with restricted current and generate a second output;
   a third unit configured to receive the second output from the second unit and generate a third output; and
   a fourth unit configured to perform a logical OR operation with the primary power input, first output from the first unit and third output from the third unit, and to generate a single fourth output.

2. The secondary power source system of claim 1, wherein the device that stores electrical energy is a capacitor.

3. The secondary power source system of claim 1, wherein the device that stores electrical energy is a super capacitor or ultra capacitor with an energy density.

4. The secondary power source system of claim 1, wherein the first unit comprising a charging unit that receives the primary power input and regulates the first power output.

5. The secondary power source system of claim 4, wherein the charging unit limits the current.

6. The secondary power source system of claim 1, wherein the device that stores electrical energy includes a plurality of capacitors in series.

7. The secondary power source system of claim 1, wherein the device that stores electrical energy includes a plurality of super capacitors in series.

8. The secondary power source system of claim 1, wherein the primary power source, first power output, third power output and fourth power output being in a range between and including 3.3 volts to 5 volts.

9. The secondary power source system of claim 1, wherein the first unit comprises a charger that accommodates the restriction of current to the predetermined amount and includes thermal regulation.

10. The secondary power source system of claim 1, wherein a logic circuit of the communication device between a vehicle and a computing device, being any one of a personal computer, and diagnostic tool, maintains a power in the fourth power output when the primary power source is reduced from a predetermined power.

11. A secondary power source system for a first device communicating between a vehicle and a computing device, comprising:
    a means for charging receiving a primary power input and restricting a current used for charging to a predetermined amount, wherein the current is part of a first output of the means for charging;
    a means for providing capacitance being charged by the first output of the means for charging and generating a second output;
    a means for regulating a voltage generating a third output from the second output from the means for providing capacitance; and
    a means for selecting via a logical OR operation between the primary power input, the first output from the charging means, and the third output from the means for regulating the voltage, and to generate a single fourth output.

12. The secondary power source system of claim 11, wherein an output from the means for selecting being forwarded to a logic circuit of the first device to be used as a secondary power source when a primary power source has been reduced, enabling communication between the vehicle and the computing device, when the primary power source has been reduced.

13. The secondary power source system of claim 11, further comprising a logic circuit receiving a predetermined power from the means for selecting when a primary power source is reduced from the power.

14. The secondary power source system of claim 11, wherein the means for providing capacitance includes a super capacitor.

15. The secondary power source system of claim 11, wherein the means for providing capacitance includes a plurality of super capacitors in series.

16. The secondary power source system of claim 11, wherein the means for charging includes a charging device controlling the current.

17. The secondary power source system of claim 11, wherein the means for charging restricts the current used for charging to a predetermined current.

18. The secondary power source system of claim 11, wherein a voltage from the means for regulating the voltage provides a voltage less than the power input of the means for charging.

19. The secondary power source system of claim 11, wherein the secondary power source providing the output power from the means for selecting operates online with a vehicle power source to provide uninterrupted power source during a cold cranking incident.

20. The secondary power source system of claim 11, wherein the output from the means for selecting accommodating only a power to a communication and memory operation of the first device being powered by the secondary power source system.

21. A method of providing a secondary power source to a device, comprising:
- receiving a primary power input and restricting a current used for charging to a predetermined amount by a first unit including a charging unit, wherein the current is part of a first output of the first unit;
- receiving the first output from the first unit with restricted current and storing a power in a second unit including a capacitance unit;
- generating a second output by the second unit;
- receiving the second output from the second unit by a third unit;
- generating a third output by the third unit; and
- performing a logical OR operation by a fourth unit with the primary power input, the first output from the first unit, and the third output from the third unit to generate a single fourth output.

22. The method of claim 21, further comprising of providing the device, linking a computing device with a vehicle, uninterrupted power supply from the single third output when there is a cold cranking incident with the vehicle.

23. The method of claim 21, wherein the capacitance unit is a super capacitor or ultra capacitor with an energy density.

24. The method of claim 21, wherein the charging unit receives the primary power input and regulates the first power output.

25. The method of claim 21, further comprises placing the device being powered by the secondary power source in a lowered power state when a primary power is lost or reduced, and the charging unit includes current and thermal regulation.

* * * * *